UNITED STATES PATENT OFFICE.

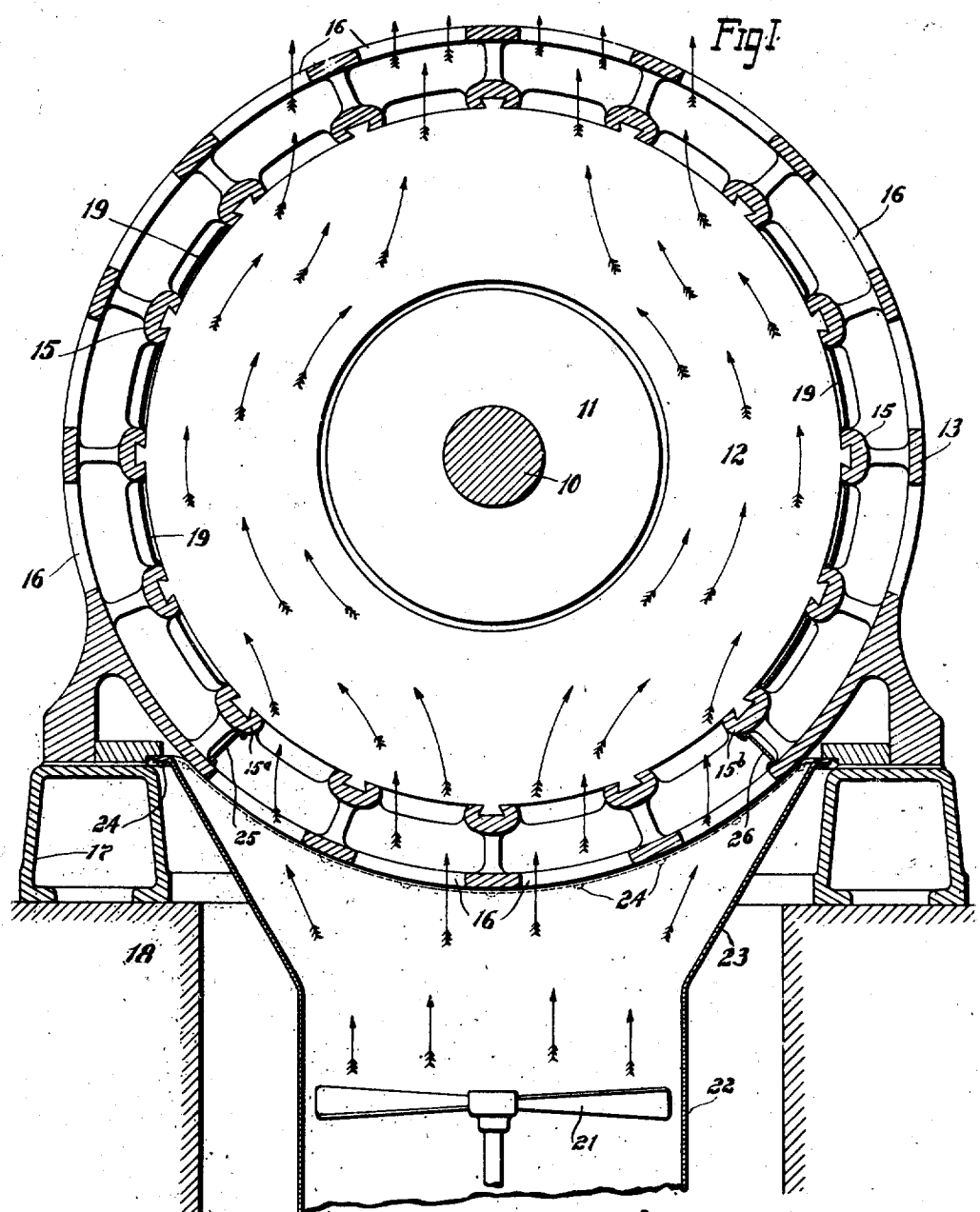

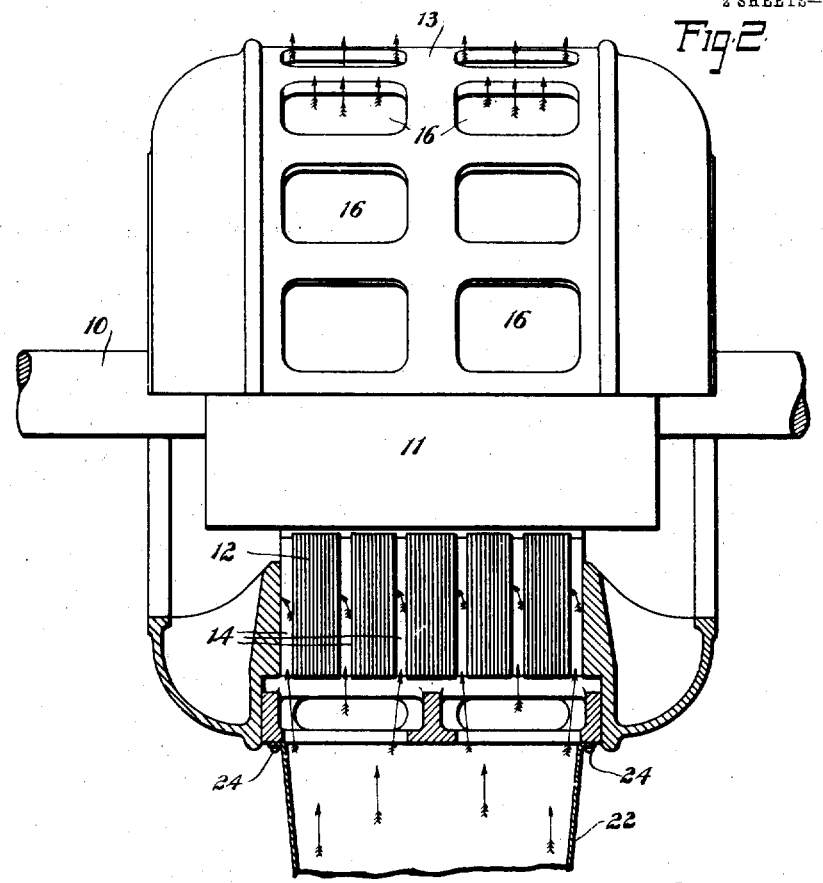
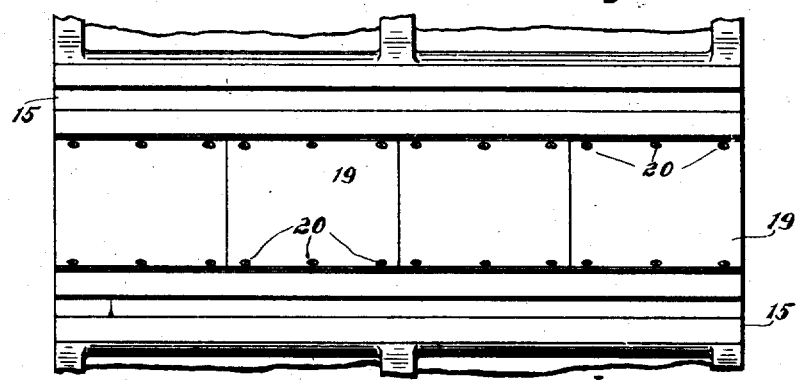

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

No. 900,977.    Specification of Letters Patent.    Patented Oct. 13, 1908.

Application filed March 26, 1906. Serial No. 308,131.

*To all whom it may concern:*

Be it known that I, BERNARD ARTHUR BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and especially to the ventilating means for the stator.

In the most recent types of machines designed for large kilowatt output and for high rotor speeds, the proper cooling of the stator has presented a very difficult problem.

In a machine designed for a comparatively small output or capacity a large rise of temperature in the stator is prevented by the fan-like action of the rotor in forcing air across the air gap between the rotor and the stator into the core and through the passageways thereof radially in all directions and out at the periphery of the frame of the machine. Under ordinary circumstances an ample amount of air can be supplied to the stator in this manner. In a machine however, designed for large kilowatt output and intended to be driven at a high speed, a sufficient volume of air can not be supplied to the stator across the gap of the machine for two reasons—first, because the heating due to the iron and copper losses of the stator is very great, and second, because of the enormous peripheral speed of the rotor it is a difficult matter to force the air radially outward into the stator core.

It often happens that before a machine of a certain capacity is completed and tested it is difficult to determine the most desirable and satisfactory method of ventilating the same. This is especially true of a machine having a radically new structural design. It is not always known therefore whether the stator can be cooled more satisfactorily by the customary scheme in which air is forced by the rotor across the air gap of the machine or by some other system of ventilating such for instance as that to be hereinafter described. It is therefore extremely advisable to construct the machine and especially the frame so that it may be ventilated by the system which proves the most desirable for that particular machine.

One of the objects of my invention is to provide a ventilating system whereby a large volume of air can be passed through the stator core in such a manner that it can be easily maintained at a uniformly low temperature.

Another object of my invention is to provide means whereby the same frame, with slight changes, can be employed in either a machine in which the stator is cooled by the air forced across the air gap of the machine by the rotor, or in which the stator is cooled by air supplied thereto in accordance with my improved scheme of ventilation, entirely independently of the rotor.

My invention consists in the details of construction and the combinations of elements described in the specification and set forth in the appended claims.

For a better understanding of my invention, reference is had to the accompanying drawings in which Figure 1 is a vertical section of the machine taken at right angles to the shaft showing my improved ventilating means; Fig. 2 is a sectional side elevation of the machine, the lower part of the core and frame being shown in section; and Fig. 3 is an enlarged detail view of a portion of the inner side of the stator frame.

Referring now to the figures of the drawing, I have shown at 10, the shaft of the machine on which is mounted rotary member 11 which is in this case intended to be the rotary field member. As this rotor forms no part of my invention, it is shown merely in outline. Surrounding the rotor is the stator which in this case is intended to be the armature. The core 12 of the stator consists of groups of laminæ which are spaced apart in the usual manner by any suitable type of separators or spacers (not shown) forming parallel circumferential ventilating passageways 14 which are open at the inner periphery of the core and which may be closed at portions of the outer periphery as will be explained. The frame or yoke 13, as in the usual construction, is provided with inwardly extending arms or ribs 15 to which are dovetailed laminæ of the core. This frame is hollow and is provided with the ordinary ventilating openings 16 at its periphery. The frame of the machine rests upon a hollow base 17 which base rests upon a concrete or masonry foundation 18.

In the former construction of machines, the air for ventilating the stator is forced by the fan-like action of the rotor across the air gap of the machine into all the passageways of the stator core and radially or tangentially outward into the frame and out at the ventilating openings 16 of the latter. As was stated above, in large machines and especially in turbo-alternators, the rotors of which are intended to be driven at high speeds, on account of the enormous iron and copper losses of the stators and on account of the great peripheral speeds of the rotors, a sufficient volume of air can not be forced across the air gaps to prevent an undesirable and dangerous rise of temperature in the machine. Furthermore, the air that is forced across the gap into the stator carries with it a certain amount of heat from the rotor.

I provide means for supplying air to the stator from an extraneous source and entirely independently of the fan action of the rotor, whereby the volume of air supplied to the stator can be varied at will, and further provide means whereby this ventilating system can be installed without necessitating a new and different type of frame or yoke. I close up portions of the openings between the stator core and the frame at each side of the machine by removable plates 19. These removable plates are preferably secured in some manner to the ribs 15 to which the core-plates are dove-tailed. A number of short plates are placed side by side across the machine between each pair of ribs, the size of the plates being such that they can be easily inserted through the ventilating openings 16 at the outer periphery of the frame. It is seen that the communicating openings between the core and the frame at both the top and bottom of the machine remain open. These plates may be secured to the frame in any desired manner. In Fig. 3 they are shown as secured to the frame by means of screws 20. Air is intended to be forced by a fan or blower shown somewhat conventionally at 21 through a tube or pipe the upper part of which is shown at 22, to the lower part of the machine frame. The foundation upon which the frame rests is open beneath the machine and the tube which is provided with a flaring or funnel-shaped end 23 extends up through this opening and is attached to the frame of the machine by rivets 24. Plates 25 and 26 extending from the outer periphery of the core to the ribs 15$^a$ and 15$^b$ adjacent the upper edge of the tube prevent the air which is forced through the tube from passing laterally into the field frame. The paths of the air currents are shown by the arrows in Figs. 1 and 2. The air passes at any desired pressure from the tube 22 through the lower part of the frame and the unclosed openings between the frame and the core, into all the circumferential air passageways 14, upward in parallel paths equally on both sides of the rotor, and outward through the openings at the top of the frame. The removable plates 19 prevent air from passing outward through the frame at any but the desired openings at the top. Very little air will pass from the stator core into the air gap between the stator and the rotor during the operation of the machine on account of the outward pressure created by the rotor itself.

It is seen that an ample supply of air can be furnished and the volume can be regulated at will. A greater or less number of the removable plates 19 can be placed between the ribs 15 to decrease or increase the size of the openings for the ingress or egress of air. The plates 19 may be secured in place either before the core laminæ are assembled in which case they may be held in place by screws or rivets, or in case it is necessary to place them in position after the core is assembled they may be held in position by soldering or by friction, in the latter case being sprung into position.

I aim in my claims to cover all modifications which do not involve a departure from the spirit and scope of my invention.

What I claim as new and desire to secure by Letters Patent is:—

1. In a dynamo-electric machine, a stationary laminated core having circumferential ventilating passageways, a supporting frame at the periphery of said core, said frame having ventilating openings at its periphery through which the air from the stator can escape, and removable means for preventing the egress of air from the core to the frame at portions of the periphery of the core.

2. In a dynamo-electric machine, a stationary laminated core having its laminæ arranged in groups spaced apart forming circumferential ventilating passageways open at its inner and outer periphery, a hollow frame surrounding and supporting said core, said frame having ventilating openings whereby the air currents can pass from the outer periphery of the frame into the core and out of the latter at its periphery, and plates for closing the communication between the outer periphery of the core and the frame at portions of the circumference of the core.

3. In a dynamo-electric machine, a rotor, a laminated stationary core having a plurality of parallel circumferential air passageways, a frame surrounding the core and having openings at its bottom and top for the ingress and egress of air respectively, independent means external to the machine for forcing a ventilating blast of air into the machine, and means for conducting the air from said independent means to the opening in the bottom of the frame whereby air from an extraneous source may be conducted into the machine through the opening at the bottom of the frame, upward through the core in parallel paths on both sides of the rotor and out of the machine at the opening at the top of the frame.

4. In a dynamo-electric machine, a rotor, a laminated stationary core having a plurality of parallel circumferential air passageways, a frame supporting and surrounding the core, means for closing the openings between the core and frame except at the bottom and top of the machine, and means separate from the machine and communicating with the opening in the bottom of the frame whereby air may be forced from an extraneous source into the core at the bottom of the machine, through the circumferential passageways of the core in parallel paths, on each side of the machine and out of the core at the top of the machine.

5. In a dynamo-electric machine, a rotor, a laminated stationary core having a plurality of parallel circumferential ventilating passageways arranged throughout the core, a frame supporting and surrounding the core, plates for closing the passageways between the outer periphery of the latter and said frame except at the bottom and top of the core, means external to the machine for forcing air into said machine, and means whereby the air blast may be led into the core through the bottom of the frame, and upward through the parallel circumferential ventilating passageways equally on both sides of the rotor, and out of the core at the top thereof.

6. In a dynamo-electric machine, a rotor, a laminated stator core having a plurality of circumferential air passageways, a frame surrounding and supporting the core, a plurality of plates closing all the openings between the core and the frame except at the top and bottom thereof, and means whereby air may be led into the frame and core at the bottom, through the core in parallel paths, on both sides of the rotor equally, and out of the core and frame at the top thereof.

7. In a dynamo-electric machine, a rotor, a stationary laminated core, having ventilating passageways extending from its inner to its outer periphery, a frame having ventilating openings, surrounding and supporting said core, said frame having at intervals ribs to which the core is secured, a plurality of plates secured to said frame between said ribs at each side of the machine and closing all communication between the passageways of the core and the frame except between the ribs at the bottom and top of the machine, said passageways being so arranged that air introduced through the frame and into the core at the bottom of the machine will pass through the core on both sides of the rotor and out of the core and frame at the top of the machine.

In testimony whereof I affix my signature, in the presence of two witnesses.

BERNARD A. BEHREND.

Witnesses:
ARTHUR F. KWIS,
FRED J. KINSEY.